United States Patent
Mafune et al.

(10) Patent No.: US 9,435,421 B2
(45) Date of Patent: Sep. 6, 2016

(54) BAFFLE PLATE AND TRANSMISSION PROVIDED WITH THE SAME

(71) Applicant: HONDA MOTOR CO., LTD., Tokyo (JP)

(72) Inventors: Shota Mafune, Wako (JP); Shuji Ueda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 101 days.

(21) Appl. No.: 14/416,350

(22) PCT Filed: Jul. 10, 2013

(86) PCT No.: PCT/JP2013/068925
§ 371 (c)(1),
(2) Date: Jan. 22, 2015

(87) PCT Pub. No.: WO2014/017301
PCT Pub. Date: Jan. 30, 2014

(65) Prior Publication Data
US 2015/0204436 A1    Jul. 23, 2015

(30) Foreign Application Priority Data
Jul. 24, 2012    (JP) .................. 2012-163927

(51) Int. Cl.
F16H 57/04    (2010.01)
(52) U.S. Cl.
CPC ...... *F16H 57/0409* (2013.01); *F16H 57/0423* (2013.01); *F16H 57/0427* (2013.01); *F16H 57/0445* (2013.01); *F16H 57/0457* (2013.01); *F16H 57/0483* (2013.01)

(58) Field of Classification Search
CPC .......... F16H 57/0409; F16H 57/0445; F16H 57/0457
See application file for complete search history.

(56) References Cited

FOREIGN PATENT DOCUMENTS

| EP | 1 544 510 A2 | 6/2005 |
|---|---|---|
| JP | 10-252871 A | 9/1998 |
| JP | 2003-130190 A | 5/2003 |
| JP | 2004-176744 A | 6/2004 |
| JP | 2006-077894 A | 3/2006 |
| JP | 4409929 B2 | 2/2010 |
| JP | 4497896 B2 | 7/2010 |
| JP | 4497897 B2 | 7/2010 |
| JP | 2011-117467 A | 6/2011 |
| JP | 2011-214640 A | 10/2011 |
| JP | 2012-052561 A | 3/2012 |
| JP | 2012-062995 A | 3/2012 |

OTHER PUBLICATIONS

International Search Report dated Sep. 17, 2013 corresponding to International Patent Application No. PCT/JP2013/068925 and English translation thereof.

*Primary Examiner* — Justin Holmes
*Assistant Examiner* — Timothy M Hannon
(74) *Attorney, Agent, or Firm* — Squire Patton Boggs (US) LLP (57) ABSTRACT

A baffle plate provided with a body section arranged to separate between a differential gear and an oil sump section, a first drain section for leading oil scooped up by the differential gear in a machine room to a control room, a notch section for defining a communicating passage between the inside surface of the casing and itself for letting oil flow from the control room to the machine room, a through-hole formed on a peripheral side of an opening of the body section and a second drain section for guiding oil scooped up by the differential gear and having passed via the through-hole to a shaft support of the differential gear.

4 Claims, 9 Drawing Sheets

BAFFLE PLATE AND TRANSMISSION PROVIDED WITH THE SAME

TECHNICAL FIELD

The present invention relates to a baffle plate and a transmission provided therewith for, in a transmission provided with a machine room defined in a casing and accommodating a plurality of gears including a differential gear, a control room accommodating a mechanism for hydraulic pressure control positioned adjacent to the machine room in the casing, and an oil sump section formed in the machine room between a inside surface of the casing and a side surface of the differential gear, reducing oil stirring resistance caused by the differential gear and performing circulating control of oil scooped up by the differential gear.

BACKGROUND ART

A conventional transmission mounted on a vehicle is provided with a machine room arranged in a casing and accommodating a plurality of gears including a differential gear, a control room positioned adjacent to the machine room in the casing and accommodating a mechanism for hydraulic pressure control of a hydraulic pressure control body, and an oil sump section arranged in an interspace between an inside surface of the casing and the differential gear in the machine room. Such transmission includes a lubricating oil supply structure for supplying oil in the casing to places in need of lubrication such as bearings supporting a rotation shaft and the gears. As described for example in Patent Documents 1, 2, some of such lubricating oil supply structures use oil scooped up by the differential gear. In the transmission, this lubricating oil supply structure forms oil films on and cools tooth surfaces of the gears, an inside of the rotation shaft and shaft supports including the bearings, thereby securing smooth performance and intensity durability of each component in the casing.

However, the lubrication structure using oil scooped up by the conventional differential gear has following problems (A1)-(A4).

(A1) Oil scooped up in the machine room (a differential room) by the differential gear drop again in the machine room along an inner wall surface of the casing, whereby enough oil does not return to the control room and an oil surface thereof is lowered. Due to this, an oil inlet provided on a bottom of the control room or in a vicinity thereof is exposed from the oil surface, allowing air biting (aeration) to occur.

(A2) On the bottom of the machine room, a communicating passage (an oil inflow part) is formed, communicating to the bottom of the control room. Part of oil in the control room is adapted to return to the machine room via this communicating passage. And, this communicating passage is formed in an interspace between the inside surface of the casing and a partition wall integrally formed to the casing. Namely, this communicating passage is a part formed by processing the casing. Therefore, stress (intensity) necessary for the casing disallows dimensions of the communicating passage to be too small, thereby failing to appropriately control a flow rate of the oil flowing into the machine room from the control room. Accordingly, an oil amount in the machine room increases, resulting in increased scooping-up resistance against the differential gear.

(A3) An oil sump section which is a space where oil is collected is formed in an interspace between a side surface of the differential gear in the machine room and an inside surface of the casing facing thereto. However, as the side surface of the differential gear is contacted with (dipped in) the oil collected in this oil sump section, the oil in the oil sump section is stirred when the differential gear rotates, causing to an increase in oil stirring resistance.

(A4) On the inside surface of the casing facing to the side surface of the differential gear, as shown in Patent Document 3 for example, a lubricating oil passage for leading part of oil scooped up in the machine room to shaft supports such as bearings of the differential gear and a spline engagement section is formed. However, as this lubricating oil passage is a ditch-shaped (hollow-shaped) section formed on the inside surface of the casing, most of the lubricating oil passing through this lubricating oil passage drop out thereof on the way into the machine room. Therefore, there is the problem that this lubricating oil passage cannot supply an enough amount of lubricating oil to the shaft supports of the differential gear.

It should be noted that some structures regulating a hydraulic fluid flow in the casing of the transmission are provided with a baffle plate installed in the casing as shown in Patent Documents 4 and 5. Such baffle plate can regulate the hydraulic fluid flow in the casing to a desired state and prevent the hydraulic fluid collected at the bottom in the machine room from being stirred due to rotation of the differential gear. However, any conventionally-structured baffle plate, any single baffle plate in particular, which can solve all the above-mentioned problems: (A1)-(A4) has not been available.

RELATED ART DOCUMENTS

Patent Documents

[Patent Document 1] Japanese Patent Laid-Open Publication No. 2004-176744.

[Patent Document 2] Japanese Patent Laid-Open Publication No. 2003-130190.

[Patent Document 3] Japanese Patent Gazette No. 4409929.

[Patent Document 4] Japanese Patent Gazette No. 4497896.

[Patent Documents 5] Japanese Patent Gazette No. 4497897.

DISCLOSURE OF INVENTION

Problems to be Solved by the Invention

In view of the above-described problems, the present invention has an object to provide a baffle plate and a transmission provided therewith which can solve the above problems (A1)-(A4).

Means of Solving the Problems

The present invention for solving the above-described problems is a baffle plate (50) arranged to separate between a differential gear (9) and an oil sump section (13) in a transmission (1). The transmission is provided with a machine room (10) defined in a casing (3) and accommodating a plurality of gears including the differential gear (9), a control room (30) accommodating a mechanism for hydraulic pressure control positioned adjacent to the machine room (10) in the casing (3), and the oil sump section (13) formed between an inside surface of the casing (3) and a side surface of the differential gear (9) in the machine room (10). The baffle plate is characterized by including a body section (51), a first drain section (61), a peripheral rib (55), a notch section (56), a communicating passage (20), a slit-shaped through-hole (57) and a second drain section (63). The body section (51) is arranged on the side of the differential gear (9) and has at a center thereof an opening (52) into which a rotation shaft (6) of the differential gear (9) is penetrated. The first drain section (61) is formed on a surface (51b) of the body section (51) on the oil sump section (13) side for leading oil scooped up in the machine room (10) by the differential gear (9) to the control room (30). The peripheral rib (55) is formed on part of a periphery of the body section (51). The notch section (56) is disposed on the peripheral rib (55). Between the inside surface (3b) of the casing (3) and the notch section (56), a communicating passage (20) through which oil flows from the control room (30) to the machine room (10) is formed. The slit-shaped through-hole (57) is formed on a periphery of the opening (52) of the body section (51). The second drain section (63) is formed below the through-hole (57) on the surface (51b) of the body section (51) on the oil sump section (13) side for guiding oil scooped up by the differential gear (9) and having passed via the through-hole (57) to a shaft support (9a) of the differential gear (9). Further, the first drain section (61) of this baffle plate may be a plate-shaped projecting piece gradually slanting downward from an upper part of the machine room (10) to an upper part of the control room (30).

The baffle plate according to the present invention, each of the above-described problems (A1)-(A4) can be solved in each of the following ways: (B1)-(B4).

(B1) The above-mentioned first drain section installed to the baffle plate receives oil scooped up in the machine room by the differential gear, and then the oil flows along the first drain section into the control room, allowing to raise an oil level of the hydraulic fluid in the control room. This can prevent to expose an oil inlet from an oil surface in the control room and air biting from the oil inlet, improving aeration performance (preventive performance of air absorption).

(B2) As the notch section for defining the communicating passage communicating between the machine room and the control room is formed on the baffle plate, dimensions of the communicating passage (dimensions of the notch section) can be set regardless of stress (intensity) necessary for the casing. Therefore, oil flowing from the control room into the machine room via the communicating passage can be limited to a desired flow rate, allowing to effectively reduce oil stirring resistance caused by the differential gear.

(B3) The baffle plate intervening to separate between the side surface of the differential gear can prevent oil in the oil sump section from contacting with the differential gear, thereby allowing to effectively reduce oil stirring resistance caused by the differential gear.

(B4) By providing the slit-shaped through-hole formed on a periphery of the opening on the body section and the second drain section formed below the through-hole on the surface of the body section on the sump section side, when oil in the machine room is scooped up by rotation of the differential gear, then the scooped-up oil is led from the front side (the differential gear side) of the baffle plate to the back side (the oil sump section side) via the slit-shaped through-hole. Then, this oil is supplied along the second drain section to the shaft supports supporting the differential gear. Therefore, a flow rate of lubrication oil supplied to the shaft supports of the differential gear can be effectively increased.

In this way, the above-mentioned baffle plate of the present invention, being a single baffle plate, has superior effects described in (B1)-(B4), allowing to attempt prevention of air biting at the oil inlet in the control room, reduction of oil stirring resistance when the differential gear rotates, and increase in a flow rate of lubricating oil supplied to the shaft support of the differential gear.

Further, of the above-described baffle plate, below the above-described through-hole (57) on the surface (51a) of the body section (51) on the differential gear (9) side, a hollow section (58) which is a surface (51a) on the differential gear (9) side hollowed toward a back side in an axial direction and continued to the through-hole (57) should be provided.

According to this configuration, due to the above-mentioned hollow section, oil scooped up by rotation of the differential gear can be efficiently taken into the through-hole, allowing to more effectively increase a flow rate of lubrication oil supplied via the second drain section to the shaft supports of the differential gear.

The present invention is also the transmission (1) provided with the machine room (10) accommodating a plurality of gears including the differential gear (9) defined in the casing (3), the control room (30) accommodating a mechanism for hydraulic pressure control positioned adjacent to the machine room (10) in the casing (3), the oil sump section (13) formed between the inside surface of the casing (3) and the side surface the differential gear (9) in the machine room (10), and the baffle plate (50) arranged to separate between the differential gear (9) and the oil sump section (13). The transmission is characterized by including, as the baffle plate (50), any of the above-described baffle plates in accordance with the present invention.

The transmission of the present invention provided with any of the above-described baffle plates of the present invention can have superior effects as described in (B1)-(B4) as a baffle plate arranged between the differential gear and the oil sump section. Therefore, this transmission can attempt to prevent air biting at the oil inlet in the control room, reduce oil stirring resistance along with rotation of the differential gear and increase a flow rate of lubricating oil supplied to the shaft supports of the differential gear. It should be noted that the above characters in parentheses represent, by way of example, reference characters of components of embodiments to be described hereinafter.

MODE FOR CARRYING OUT THE INVENTION

Figure 1:
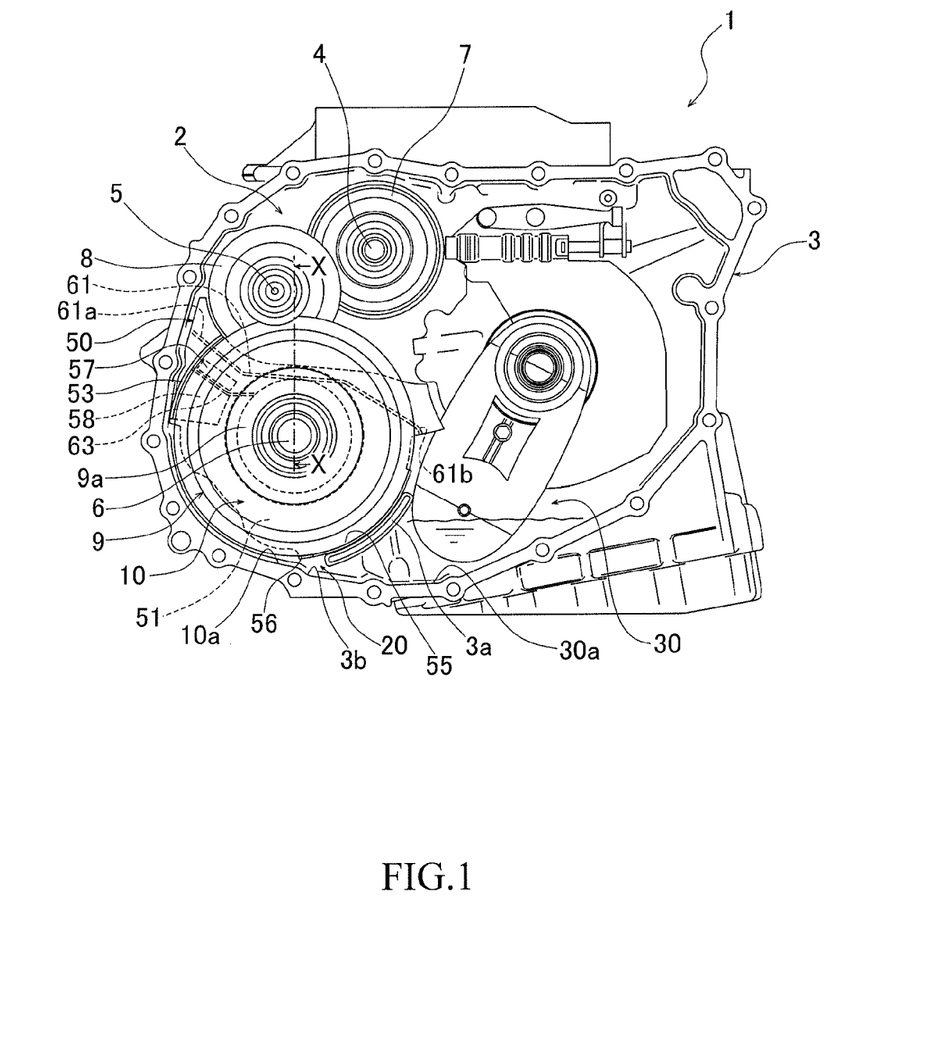
FIG. 1 is a schematic cross-sectional side view showing an internal structure of a transmission provided with a baffle plate according to one embodiment of the present invention.
Figure 2:
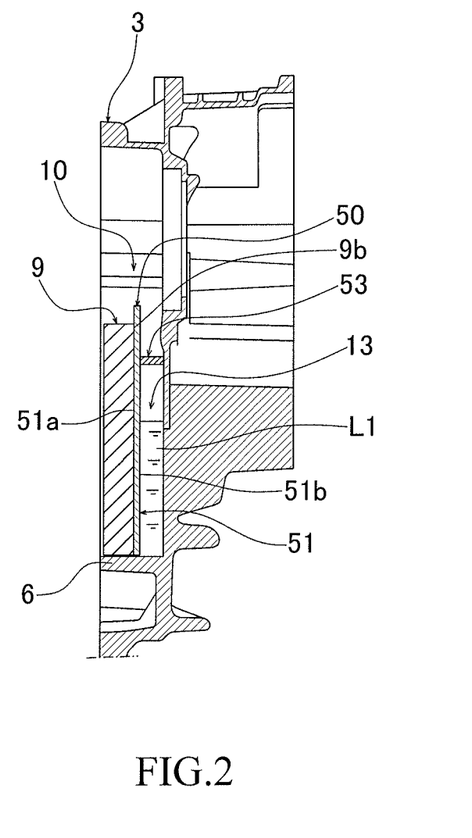
FIG. 2 is an X-X schematic cross-sectional view of FIG. 1.

Hereinafter, an embodiment of the present invention will be described in detail with reference to the appending drawings. FIG. 1 is a schematic cross-sectional side view showing an internal structure of a transmission provided with a baffle plate according to one embodiment of the present invention, and FIG. 2 is an X-X schematic cross-sectional view of FIG. 1. The transmission 1 shown in FIG. 1 includes a casing 3 accommodating components such as a gear mechanism 2 to be described later and a hydraulic pressure control body. The inside of the casing 3 is divided into two rooms: a machine room 10 accommodating the gear mechanism 2 and a control room 30 accommodating a hydraulic pressure control body.

The gear mechanism 2 in the machine room 10 includes an input shaft 4 to which a rotation from an engine (not illustrated in the figure) is input, and an output shaft 5 and a differential shaft (a rotation shaft) 6, both of which are positioned parallel to the input shaft 4. The gear mechanism 2 also includes various kinds of gears 7, 8 and clutches (not illustrated in the FIG.) for setting each of gear ratio steps installed on each of the input and output shafts 4, 5, and a differential gear 9 installed on the differential shaft 6. The differential gear 9 is supported on the differential shaft 6 with a gear spline (a shaft support) 9a and placed in a vicinity of a bottom 10a of the machine room 10. It should be noted that "axial direction" in the following description refers to the axial directions of the input shaft 4 and the output shaft 5. "Lateral direction" in the following description refers to a crosswise direction (width direction) intersecting the axial direction. "Above", "over" or "upper" and "under", "below" or "lower" in the present specification should refer respectively to "above", "over" or "upper" and "under", "below" or "lower" in a state of the transmission 1 installed on a vehicle (as shown in FIG. 1).

As shown in FIG. 1, at a position along a peripheral end surface of the differential gear 9 in a vicinity of a bottom 10a of the machine room 10, an arc-shaped partition wall 3a is formed for separating between the machine room 10 and the control room 30. The partition wall 3a is integrally formed on the inside surface of the casing 3. This partition wall 3a separates between the bottom 30a of the control room 30 and a vicinity thereof and the bottom 10a of the machine room 10 and a neighborhood thereof. Some interspace is defined between a lower end of the partition wall 3a and a lower inside surface 3b of the casing 3 facing thereto. In this interspace, part of a lower end side 55a of a lower peripheral rib 55 of the baffle plate 50 to be mentioned later is arranged to be projected. And, on this projected lower peripheral rib 55, a notch section 56 is provided for defining a communicating passage 20 communicating between the machine room 10 and the control room 30.

In addition, as shown in FIG. 2, between a back side (side surface) 9b of the differential gear 9 and the inside surface of the casing 3 facing thereto, an oil sump section 13 is formed for accumulating therein hydraulic fluid inside the machine room 10. And, at a position along the back side 9b of the differential gear 9, the baffle plate 50 is arranged to separate between the differential gear 9 and the oil sump section 13. A detailed configuration of the baffle plate 50 will be described later.

Oil collected at the bottom 30a of the control room 30 is sucked in from an oil inlet (not shown in the figure) opening on the bottom 30a of the control room 30 or in a vicinity thereof. The oil sucked in from this oil inlet is supplied to an oil hydraulic circuit such as a control body (not shown in the figure) provided by the transmission, and used for hydraulic fluid pressure to operate a bulb mechanism for shift control. This oil is also supplied as lubrication oil to bearings of the input shaft 4, the output shaft 5 and the differential shaft 6. And, the lubrication oil supplied to the gears and bearings in the machine room 10 is adapted to accumulate in the oil sump section 13 (ref. FIG. 2) in the machine room 10. The oil collected at the bottom 10a (in a neighborhood of the differential gear 9 and in the oil sump section 13) of the machine room 10 is scooped up by rotation of the differential gear 9.

Figure 3:
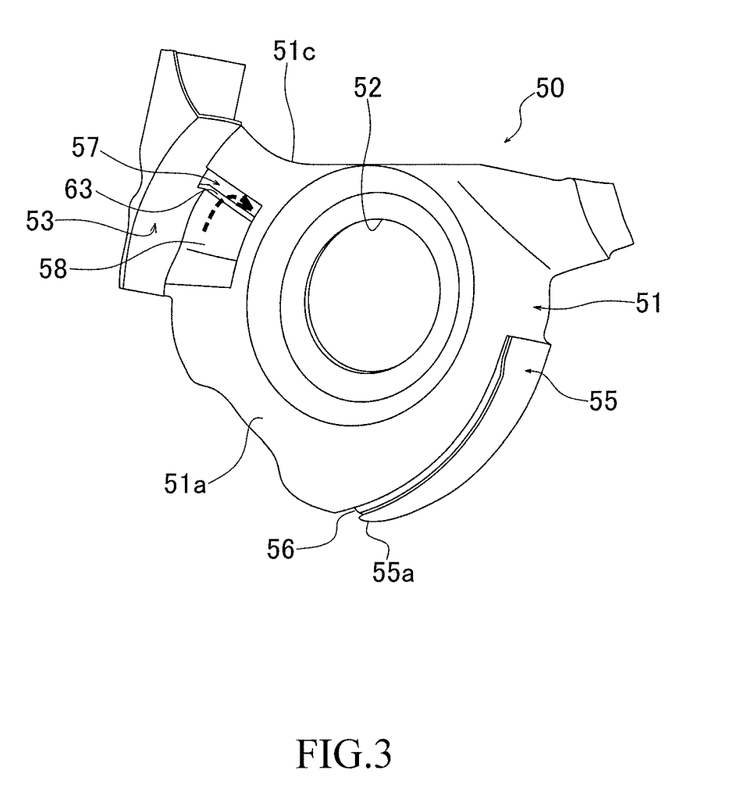
FIG. 3 is a perspective view showing the baffle plate viewed from the front side thereof.
Figure 4:
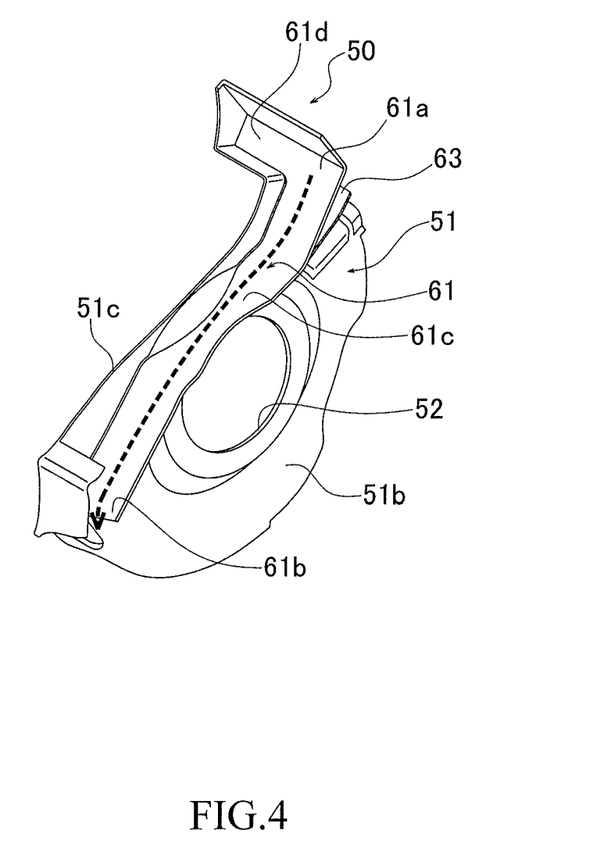
FIG. 4 is a perspective view showing the baffle plate viewed from above on the back side.
Figure 5:
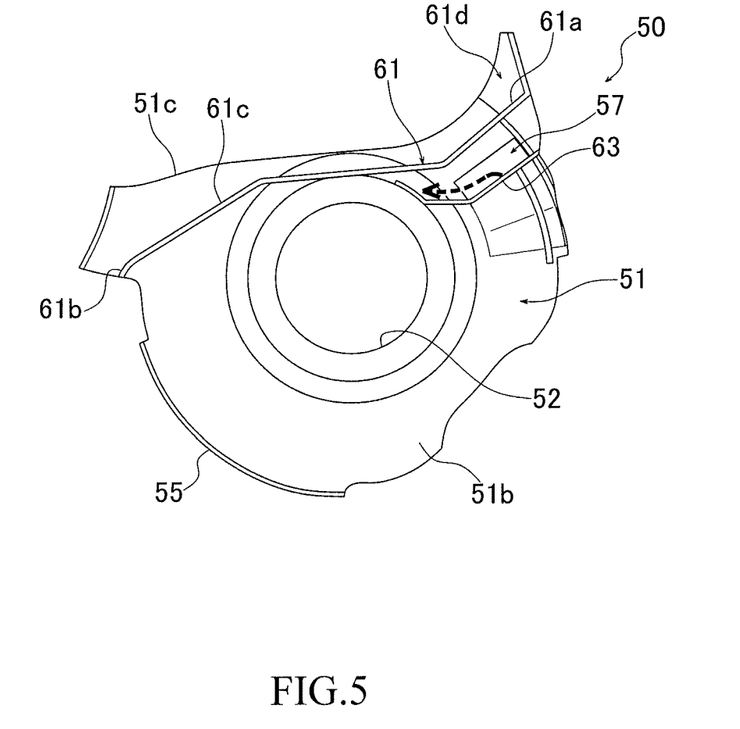
FIG. 5 is a rear view of the baffle plate.
Figure 6:
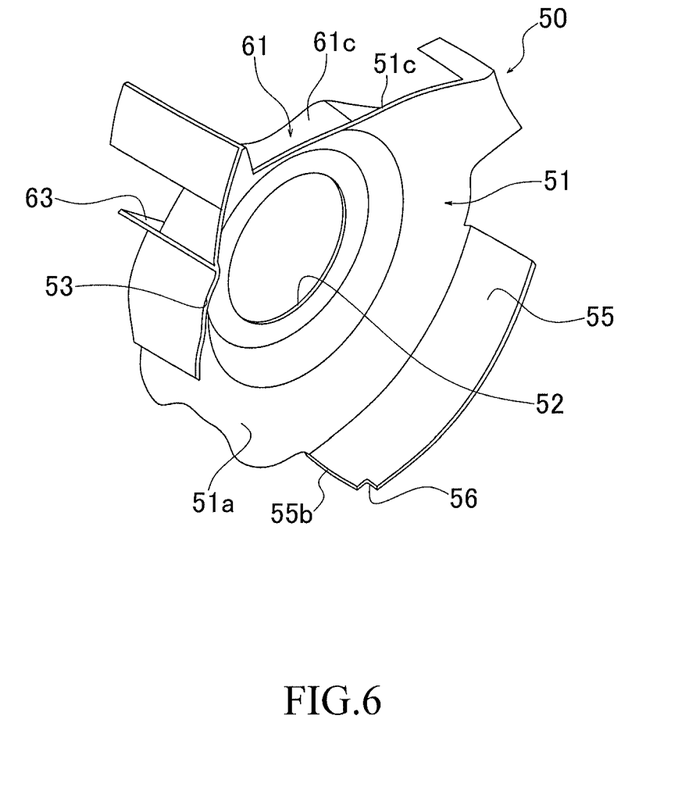
FIG. 6 is a perspective view of the baffle plate viewed from above on the front side.

Hereinafter, the baffle plate 50 installed in the casing 3 will be described in detail. FIGS. 3 to 6 are views of the baffle plate 50. FIG. 3 is a perspective view of the baffle plate 50 viewed from the front side. FIG. 4 is a perspective view of the baffle plate 50 viewed from above on the back side. FIG. 5 a rear view of the baffle plate 50. FIG. 6 is a perspective view of the baffle plate 50 viewed from above on the front side.

The baffle plate 50 is a plate-shaped member structured by an integrally-molded article made of synthetic resin. This baffle plate 50 includes substantially-circular flat plate-shaped body section 51. In the center of the body section 51, an opening 52 which is a circular through-hole penetrated by a differential shaft (a rotation shaft) 6 (ref. FIG. 1) is formed. At a peripheral edge on the front side 51a of the body section 51 (referring to "on the surface of the body section 51 on the differential gear 9 side". The same is applied in the following.), an upper peripheral rib 53 and a lower peripheral rib 55 are formed, projecting from the periphery of the body section 51 toward the front side 51a along the axial direction and extending in a substantially-circular arc shape along a circumferential direction. The upper peripheral rib 53 is provided at a position surrounding part of a top left side of the differential gear 9 viewed from the front side 51a of the body section 51, and so is the lower peripheral rib 55 at a position surrounding part of a right bottom side of the differential gear 9. It should be noted that a peripheral edge except the upper peripheral rib 53 and the lower peripheral rib 55 of the body section 51 is manufactured in a shape along the inside surface of the casing 3.

And, as shown in FIG. 6, the lower peripheral rib 55 has a notch section 56. This notch section 56 is a tip (a corner) of the lower end side 55a of the lower peripheral rib 55 notched in a substantially-rectangular shape. And, as will be described, this notch section 56 is a portion for defining an interspace for a communicating passage 20 between the baffle plate 50 and the side surface 3b of the casing 3 in a state that the baffle plate 50 is installed on the back side 9b of the differential gear 9.

On the other hand, the upper end side 51c of the body section 51 has a shape of a substantially-straight line extending in the lateral direction. And, a narrow plate-shaped first drain section 61 is formed below the upper end side 51c on the back side 51b of the body section 51, extending in the lateral direction along the upper end side 51c. The first drain section 61 is a narrow plate-shaped piece projecting to the axial direction from the back side 51b of the body section 51, extending, through between the upper end side 51c and the opening 52, in the lateral direction between both sides of the body section 51. And, the first drain section 61 has a gentle slope shape with a top surface 61c thereof gradually slanting downward from the upper end 61a to the lower end 61b. Namely, the first drain section 61 is configured to be gradually lowered from the upper end 61a toward the lower end 61b. Accordingly, the first drain section 61 is adapted to allow oil to naturally flow down by gravity from the upper end 61a toward the lower end 61b. The upper end 61a of the first drain section 61 is arranged directed upward, and the lower end 61b thereof is arranged directed downward. It should be noted that at a front side of the upper end 61a (on the front side 51a of the body section 51), a saucer-shaped oil reservoir 61d is installed at an upper end of an upper peripheral rib 53. This oil reservoir 61d is surrounded on three sides thereof and opening upward.

Further, as shown in FIG. 5, on an inside of the upper peripheral rib 53 on an outside diameter side of the opening 52, a slit-shaped through-hole 57 communicating from the front side 51a to the back side 51b of the body section 51. Viewed from the front side 51a of the body section 51, the through-hole 57 is positioned on a top left side of the opening 52 and formed in a substantially-rectangle shape, extending toward a center of the opening 52 in a diameter direction. Also, under the through-hole 57 on the front side 51a of the body section 51, a hollow section 58 which is the front side 51a of the body section 51 hollowed toward the back side 51b in the axial direction is formed. A lower end of this hollow section 58 continues, in a shape of sloped surface, from the front side 51a of the body section 51, and an upper end thereof continues to a lower end side of the through-hole 57. In this way, the through-hole 57 on the front side 51a is open downward, allowing to easily take in oil scooped up from below.

On a back side 51b of the body section 51, the through-hole 57 is open under a position in a vicinity of an upper end 61a of the first drain section 61. Below the through-hole 57, a second drain section 63 formed in a narrow plate-shaped is provided for guiding the hydraulic fluid, which has flowed out from the through-hole 57, toward the opening 52. Similar to the first drain section 61, the second drain section 63 is a plate-shaped member axially projecting from the back side 51b of the body section 51, extending in substantially-lateral direction from a position along a lower end side of through-hole 57 to a position along a periphery of the opening 52.

As shown in FIGS. 1 and 2, the baffle plate 50 having the above configuration is arranged along the back side (a side surface) 9b of the differential gear 9 in the machine room 10. In other words, the body section 51 of the baffle plate 50 faces the back side 9b of the differential gear 9. And, the upper peripheral rib 53 and the lower peripheral rib 55 are disposed to surround respectively in an arc-like shape a diagonally-downward right part and a diagonally-upward left part of the peripheral end surface of the differential gear 9, viewed from the front side 51a of the body section 51.

In addition, as shown in FIG. 2, the oil sump section 13 for accumulating hydraulic fluid in the machine room is formed between the back side 51b of the baffle plate 50 and the inside surface of the casing 3 facing thereto. The first drain section 61 of the baffle plate 50 is arranged to hang over the oil sump section 13. The lower end 61b of the first drain section 61 is positioned protruding over the control room 30.

Further, in a state of the baffle plate 50 installed in the machine room 10, the notch section 56 formed on the lower peripheral rib 55 is arranged between the partition wall 3a and the side surface 3b of the casing 3. In this state, the interspace for defining the communicating passage 20 is formed between the side surface 3b of the casing 3 and the notch section 56.

Figure 7:
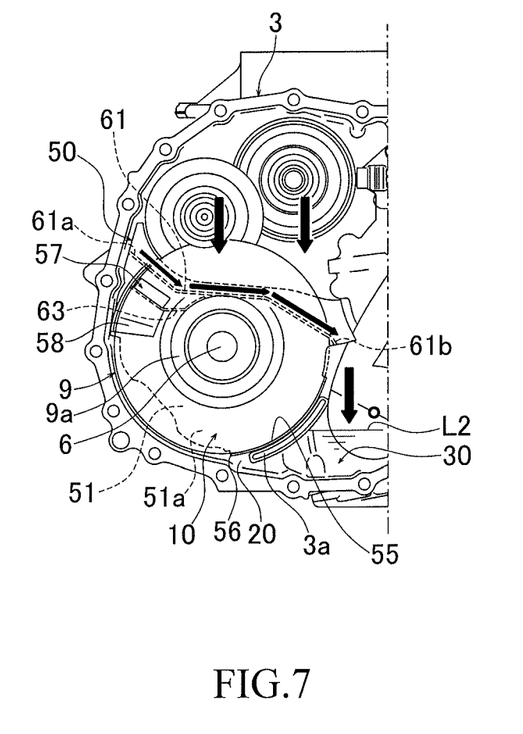
FIG. 7 is a view for illustrating a hydraulic fluid flow in a casing due to the baffle plate.
Figure 8:
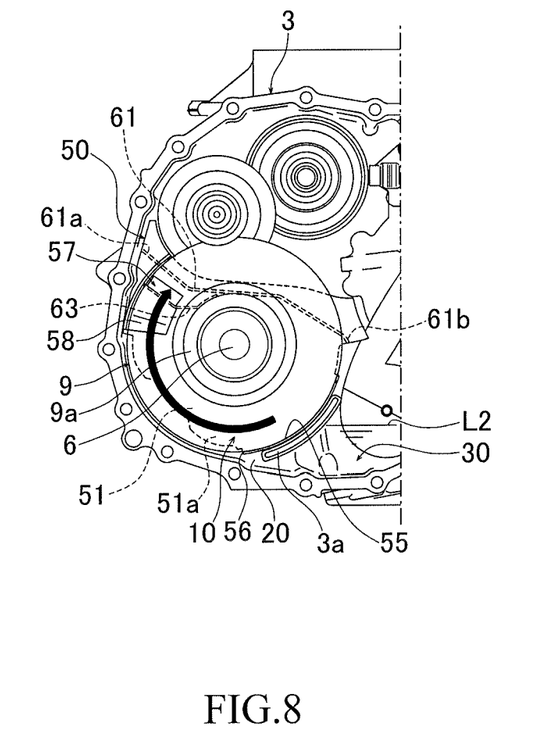
FIG. 8 is another view for illustrating a hydraulic fluid flow in the casing due to the baffle plate.
Figure 9:
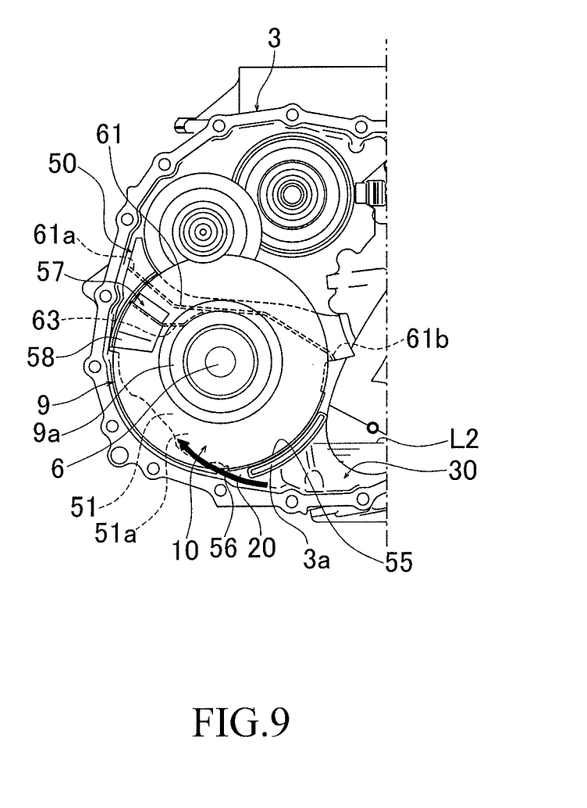
FIG. 9 is another view for illustrating a hydraulic fluid flow in the casing due to the baffle plate.

FIGS. 7 to 9 are views for illustrating a hydraulic fluid flow in the machine room using the baffle plate 50. Without the first drain section 61 installed to the baffle plate 50, the hydraulic fluid scooped up in the machine room 10 by a rotation of the differential gear 9 would again run down in the machine room 10 as shown by the arrow of FIG. 7. In contrast, the first drain section of the present embodiment receives the hydraulic fluid, prevented from running down in the machine room 10. The hydraulic fluid received by the first drain section 61 flows from the upper end 61a to the lower end 61b along the first drain section 61, and flows down in the control room 30 from the lower end 61b.

In this way, the first drain section 61 is provided with the baffle plate 50, whereby the oil scooped up by the differential gear 9 in the machine room 10 is received by the first drain section 61 and flows into the control room 30 along the first drain section 61. This results in a raise in an oil surface L2 in the control room 30, allowing to prevent the oil inlet from being exposed therefrom. Therefore, an air biting at the oil inlet can be prevented, improving aeration performance (air absorption prevention performance).

Further, the first drain section 61 of the above-described baffle plate 50 is a plate-shaped projecting piece gradually slanting downward to an upper part in the control room 30 from an upper part in the machine room 10. According to this configuration, oil pumped up by the differential gear 9 in the machine room 10 can flow down naturally by gravity along the first drain section 6 and then be securely guided to the control room 30.

Further, the baffle plate 50 provided with the above-described through-hole 57 and the second drain section 63 can cause a following effect. When oil accumulated at the bottom of the machine room 10 is scooped up by a rotation of the differential gear 9, this scooped-up oil is, as shown in FIGS. 3 and 8, led from the front side 51a to the back side 51b of the body section 51 via the slit-shaped through-hole 57. This oil is led to a gear spline (a shaft support) 9a on the differential shaft 6 along the second drain section 63 installed on the back side 51b of the body section 51. Thus, a flow rate of the lubricating oil supplied to the gear spline 9a on differential shaft 6 can be effectively increased.

Further, as shown in FIG. 9, part of oil in the control room 30 is adapted to return to the machine room 10 via the communicating passage (the oil inflow part) 20 provided between the machine room 10 and the control room 30. In this embodiment, due to the notch section 56 for this communicating passage 20 formed on the baffle plate 50, dimensions of the communicating passage 20 (dimensions of the notch section 56) can be set regardless of stress (intensity) needed for the casing 3. Thus, as the oil flowing from the control room 30 into the machine room 10 via the communicating passage 20 can be limited to a desired flow rate, oil stirring resistance in the machine room 10 can be effectively reduced.

Also, in the transmission 1 of this embodiment, as shown in FIG. 2, the body section 51 of the baffle plate 50 intervenes to separate between the differential gear 9 and the oil sump section 13. Due to this, oil in the oil sump section 13 can be prevented from contacting with the differential gear 9. Therefore, oil stirring resistance caused by a rotation of the differential gear 9 in the machine room 10 can be reduced.

Further, below the through-hole 57 on the front side 51a of the body section 51 (on the surface on the differential gear 9 side) of the above-mentioned baffle plate 50, a hollow section 58 is provided for taking oil scooped up by the differential gear 9 into the through-hole 57. Due to this hollow section 58, the oil scooped up by the differential gear 9 can be more efficiently taken into the through-hole 57. Therefore, a flow rate of the lubricating oil supplied via the second drain section 63 to the gear spline 9a on the differential shaft 6 can be more effectively increased.

While the embodiments of the invention have been described, it is to be understood that the invention is not limited to the foregoing embodiments. Rather, the invention can be modified to incorporate any number of variations or alterations within the scope of claims and the scope of technical concept described in the specification and the drawings thereof. For example, the particular configuration of the transmission shown in the above-described embodiment is one example. The baffle plate in accordance with the present invention can be applied to transmissions having other configurations. Also, the particular shape of the baffle plate according to the present invention is one example. The baffle plate according to the present invention is installed so as to separate between the differential gear and the oil sump section. It may have other particular shapes than that shown in the above embodiment as far as it includes component parts corresponding to the above-described first drain section, the through-hole, the second drain section and the notch section.

The invention claimed is:

1. A baffle plate in a transmission, the transmission comprising a machine room defined in a casing and accommodating a plurality of gears including a differential gear, a control room accommodating a mechanism for hydraulic pressure control arranged adjacent to the machine room in a casing and an oil sump section formed in the machine room between an inside surface of the casing and a side surface of the differential gear, the baffle plate arranged to separate between the differential gear and the oil sump section, the baffle plate comprising:

a body section arranged on the side of the differential gear and having at a center thereof an opening into which a rotation shaft of the differential gear is penetrated;

a first drain section formed on a surface of the oil sump section side of the body section for leading oil scooped up in the machine room by the differential gear to the control room;

a peripheral rib formed on part of a periphery of the body section;

a notch section disposed on the peripheral rib and forming, between the inside surface of the casing and itself, a communicating passage for letting oil flow from the control room to the machine room;

a slit-shaped through-hole formed on a peripheral side of the opening of the body section; and a second drain section formed under the through-hole on the surface of the oil sump section side of the body section and guiding oil scooped up by the differential gear and having passed via the through-hole to a shaft support of the differential gear.

2. The baffle plate according to claim 1, wherein the first drain section is a plate-shaped projecting piece gradually slanting downward to an upper part of the control room from an upper part of the machine room.

3. The baffle plate according to claim 2, wherein under the through-hole on the surface of the body section on the differential gear side, a hollow section which is a surface on the differential gear side hollowed toward a back side in an axial direction and continued to the through-hole is disposed.

4. The baffle plate according to claim 1, wherein under the through-hole on the surface of the body section on the differential gear side, a hollow section which is a surface on the differential gear side hollowed toward a back side in an axial direction and continued to the through-hole is disposed.

* * * * *